United States Patent Office 3,167,573
Patented Jan. 26, 1965

3,167,573
CYANOETHYLATION OF ORGANOSILANES
Siegfried Nitzsche and Paul Buchheit, Burghausen, Bavaria, Germany, assignors to Wacker-Chemie G.m.b.H., Munich, Bavaria, Germany
No Drawing. Filed Nov. 9, 1961, Ser. No. 151,202
Claims priority, application Germany, Nov. 14, 1960, W 28,906
11 Claims. (Cl. 260—448.2)

This invention relates to a new and improved method of cyanoethylating organosilanes and particularly monoorganosilanes.

The preparation of a new class of silanes containing hydrocarbon substituents and cyanoalkyl substituents bonded to silicon as well as hydrolyzable atoms or radicals bonded to silicon has recently been the subject of a considerable amount of publications including patents. These silanes are useful as intermediates in the preparation of novel elastomers, resins and fluids which display excellent resistance to many organic solvents. It is known that organocyanoalkyldichlorosilanes can be prepared by reacting an organodichlorosilane with an unsaturated nitrile with more than three carbon atoms in the presence of catalysts. Yields from such reactions are acceptable but the unsaturated nitriles with more than three carbon atoms are difficult to obtain.

It is also known that trichlorosilane ($HSiCl_3$) can be reacted with acrylonitrile to obtain cyanoethyltrichlorosilane in moderate yield but the analogous reaction with organohydrogendichlorosilanes (e.g. $CH_3SiHCl_2$) are unsatisfactory for commercial use. It has been proposed to react the cyanoethyltrichlorosilane prepared via the acrylonitrile+$HSiCl_3$ reaction with a Grignard reagent to introduce one or more additional organic groups into the silane. However, many by-products and undesirable materials are obtained by such a reaction hence the inefficiency of the method makes it commerically unattractive.

It is the primary object of this invention to introduce a novel method for reacting acrylonitrile with organohydrogensilanes. A commercial method for preparing organocyanoethylsilanes in good yield is also an object of this invention. A novel catalyst system for effecting the reaction of acrylonitrile with hydrogen on silicon is also an object of this invention. Other objects and advantages of this invention are detailed in or will be apparent from the disclosure and claims following.

This invention is directed to the reaction of acrylonitrile with silanes of the general formula $R_nHSiX_{3-n}$ wherein each R is a monovalent hydrocarbon radical free of aliphatic unsaturation, $n$ has a value from 0–3, preferably 1 or 2, and X is a hydrolyzable atom or radical such as a halogen atom, alkoxy radical, aryloxy radical, halogenoalkoxy radical or halogenoaryloxy radical, at a temperature in the range of 40°–350° C., in the presence of a catalyst system consisting of platinum and a compound selected from the group consisting of (1) heterocyclic amines, (2) compounds of the general formula

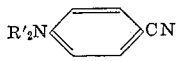

wherein R' is an alkyl radical of less than 7 carbon atoms, a cyanoalkyl radical of less than 7 carbon atoms, or a hydrogen atom, (3) dialkylcyanamides, (4) cyanoethylated amines, (5) cyanoethylated acid amides, (6) diaryl amines, (7) any of the so-called "hindered phenols" and (8) quinoidal pigments or dyes.

The operable silanes are of the general formula $R_nHSiX_{3-n}$. Each R is a monovalent hydrocarbon radical free of aliphatic unsaturation such as alkyl radicals such as methyl, ethyl, propyl, butyl, pentyl and octadecyl radicals; cycloalkyl radicals such as cyclopentyl, cyclohexyl, methylcyclopentyl, and ethylcyclohexyl radicals; aryl radicals such as phenyl, naphthyl, tolyl and methylnaphthyl radicals. In the preferred species, each R is a methyl radical. There may be 0, 1, 2 or 3 R radicals bonded to each silicon of the silane reactant. Where multiple R groups are present, they can all be the same as in dimethylhydrogenchlorosilane or they can be different as in phenylmethylhydrogenchlorosilane. It is preferred that at least one R group and not more than two R groups be bonded to each silicon in the silane reactant and particularly useful products are obtained with monoorganosilanes ($RHSiX_2$). Mixtures of various silane types can be employed (i.e. $RHSiCl_2$ in mixture with $R_2HSiCl$ or $CH_3SiHCl_2$ in mixture with $C_6H_5SiHCl_2$). The substituents represented by X are readily hydrolyzable atoms or radicals. Examples of the substituents represented by X are halogen atoms such as F, Cl, Br and I; alkoxy radicals such as methoxy, ethoxy and propoxy; aryloxy radicals such as phenoxy, naphthyloxy and tolyloxy; halogenoalkoxy radicals such as beta-chloroethoxy, bromomethoxy and chloropropoxy; and halogenoaryloxy radicals such as chlorophenoxy. The hydrolyzable radicals can be characterized by the formula —OZ where Z is alkyl, aryl, halogenoalkyl or halogenoaryl. The preferred species represented by X is the chlorine atom.

The silane and acrylonitrile can be employed over a wide range of proportions from 1/20 to 20/1 by weight. Best results are achieved with a silane/acrylonitrile ratio of from 1/2 to 2/1, on a weight basis.

The reaction is carried forward at temperatures in the range from 40° C. to 350° C. under autogenous pressure. The preferred reaction temperatures are in the range 175° to 250° C. and particularly 225° C. to 235° C.

The platinum can be employed in the forms generally known for platinum catalysts such as platinum on charcoal or other carrier as well as finely divided Pt metal. However, it is preferred to add the platinum as chloroplatinic acid and particularly as the hexahydrate, $H_2PtCl_6 \cdot 6H_2O$. The chloroplatinic acid is soluble in polar solvents such as alcohol, water, glycols and organic esters and it is often useful to employ solutions of the chloroplatinic acid to simplify handling and measuring the minute quantities of platinum required to catalyze the reaction. The platinum is employed in amounts of at least $10^{-8}$ mols of Pt per mol of acrylonitrile present. Preferably $10^{-5}$ to $10^{-3}$ mols of Pt per mol of acrylonitrile is employed. Yield of product is further improved by employing an inert carrier such as silica gel, asbestos, gamma-aluminum oxide or activated carbon in conjunction with the chloroplatinic acid thereby providing a site on which the metallic Pt can precipitate and remain in the reaction mass. When the inert carrier is employed, it should be present in amounts of from 20 to 200 times, preferably 30 to 60 times, the weight of Pt employed.

In addition to the platinum catalyst, the reaction of this invention employs as a co-catalyst any one or more of the several nitrogen compounds defined below.

The co-catalyst can be a heterocyclic amine. Such amines are compounds having one or more heterocyclic rings containing carbon, nitrogen, and, if desired, sulphur atoms in the rings. The ring atoms can be substituted with alkyl or aryl radicals in the place of some of the hydrogen atoms normally present. The preferred heterocyclic amine is pyridine and operative species include 2-aminopyridine, 9-aminoacridine, 2-aminothiazole, methylpyridine, dimethyl pyridine, ethyl pyridine, trimethyl pyridine, ethylmethyl pyridine, propyl pyridine, tetramethylpyridine, ethyl dimethyl pyridine, rubidine, viridene, diaminodimethylacridene, amidothiazoles, methylthiazoles, dimethylthiazoles and trimethylthiazoles.

The nitrogen containing co-catalyst can be a compound of the formula

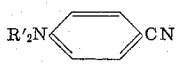

where each R' is a hydrogen atom or an alkyl radical or cyanoalkyl radical of less than 7 carbon atoms. Examples of such compounds include p-aminobenzonitrile, p-alkylaminobenzonitrile, p-dialkylaminobenzonitrile, p-cyanoalkylaminobenzonitrile, p-dicyanoalkylaminobenzonitrile and p-alkylcyanoalkylaminobenzonitrile and more specifically p-ethylaminobenzonitrile, p-diethylaminobenzonitrile, p-cyanoethylaminobenzonitrile and p-ethylcyanonethylaminobenzonitrile. Any of the ethyl and cyanoethyl radicals in the foregoing examples can be replaced with other alkyl or cyanoalkyl radicals of less than 7 carbon atoms.

A third class of nitrogen containing catalysts employed herein with the platinum are the dialkylcyanamides of the formula $R''_2NCN$ where each $R''$ is an alkyl radical such as methyl, ethyl, propyl, butyl and nonyl. Preferred are the diethyl and dimethyl cyanamides and ethylmethyl cyanamide is effective.

Diarylamines of the formula $R'''_2NH$ wherein the $R'''$ radicals are aryl radicals which can be the same or different. Examples of $R'''$ are phenyl, tolyl, naphthyl, anthryl and phenanthryl radicals and examples of the diaryl amines are diphenyl amine, dinaphthyl amine, phenyltolyl amine and tolylphenanthryl amine.

Good yields are also obtained employing as the co-catalyst a cyanoethylated amine of the formula $$CH_3N(CH_2CH_2CN)_2$$

or acyanoethylated acid amide of the formula

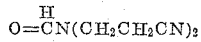

Also operative are cyanoethylated amines obtained by cyanoethylating polyamines. In addition to the many nitrogen-containing compounds listed above, the so-called "hindered phenols," quite fully discussed in U.S. Patent 2,908,700, are also operative in conjunction with the Pt. The hindered phenols are tri-substituted with bulky, preferably branched chain, alkyl radicals on both ortho positions to the —OH radical, and a bulky straight chain alkyl, branched alkyl, cycloaliphatic, aromatic or a "hindered phenol" radical in the para-position to the —OH radical. Examples of the hindered phenols are 2,4,6-tri-tertiary-butylphenol,
2,6-di-tert.-butyl-4-methylphenol,
2,4-di-tert.-butyl-6-phenylphenol,
2,4-di-tert.-butyl-6-cyclohexylphenol,
2,4,6-tri-tert.-amylphenol,
2,4-di-tert.-amyl-6-tert.-butylphenol,
2,4-di-tert.-amyl-6-cyclohexylphenol,
2,6-di-tert.-amyl-4-methylphenol,
2,6-di-tert.-amyl-4-tert.-butylphenol,
2-tert.-butyl-4-methyl-6-tert.-amylphenol, and
2,2'-methylene-bis(4-methyl-6-tert.-butyl-phenol).

Finally, good yields are obtained when platinum is used together with quinoidal pigments. Examples of quinoidal pigments are triphenylmethane pigments such as fuchsin, crystal-violet and malachite green; oxazine pigments such as capri blue; thiazine pigments such as methylene blue, phenazine pigments such as induline, indamine blue, amethyst violet, and neutral violet; benzanthrone pigments such as violanthrone; and flavanthrone pigments such as indenthrene yellow.

All these materials employed as co-catalysts in addition to the platinum are added in quantities of from 0.2 to 10 percent by weight, preferably from 1 to 3 percent by weight, based on the total weight of acrylonitrile and silane reactants employed.

Many of the compounds described above and useful as co-catalysts together with the platinum, are disclosed and described in U.S. Patents Nos. 2,906,764, 2,908,699, 2,908,701 wherein they are used for combining silanes and unsaturated nitriles. However, their greatly improved efficacy when employed with platinum in the reaction of this invention is most surprising and unexpected.

The products of this invention can be employed to treat fillers employed in organic rubber as well as in silicone rubber. These silanes are also useful in treating fabrics, papers and other base materials to render them hydrophobic and oleophobic. The silanes are also useful as intermediates in the preparation of silicone rubber, silicone resins and silicone fluids.

The following examples are included herein to aid those skilled in the art in understanding and practicing the invention. The scope of the invention is not limited by the examples but is delineated in the claims.

*Example 1*

1150 g. (10 mols) of methylhydrogendichlorosilane were mixed with 265 g. (5 mols) of acrylonitrile in a glass utensil. This mixture was stirred with 50 g. p-aminobenzonitrile then with 5 g. of active charcoal and finally wth 5 ml. isopropanol which contained 125 mg. Pt in the form of $H_2PtCl_6 \cdot 6H_2O$. This mixture was placed in a 2.8 liter stainless steel autoclave with mechanical stirrer; the autoclave was sealed and heated for 12 hours to 225° to 235° C. During the reaction the pressure fell from a maximum of 65 atmospheres to 27 atmospheres. After cooling, the reaction product was distilled at 0.1 to 0.3 mm. Hg and all fractions passing over at less than 220° C. were collected. This distillate was freed at atmospheric pressure of components boiling under 150° C. and the fractions passing over between 70° and 110° C. at 1 to 2 mm. Hg were collected from the remaining residue. Pure distillation of this fraction at 75° to 85° C. at 0.1 to 0.3 mm. Hg yielded beta-cyanoethylmethyldichlorosilane. Yield: 332 g. =45.5% of the theoretical. Without the use of $H_2PtCl_6$/active carbon, only 129 g.=15.3% of the theoretical yield are obtained.

*Example 2*

Beta-cyanoethylmethyldichlorosilane was prepared as described in Example 1 but instead of the p-aminobenzonitrile an equal quantity of dimethylcyanamide was used. Yield: 211 g.=25.1% of the theoretical. Without concurrent use of Pt/active carbon, the yield is only 81 g.=9.6% of the theoretical.

*Example 3*

Beta-cyanoethylmethyldichlorosilane was prepared as described in Example 1 using 50 g. diethylcyanamide instead of the p-aminobenzonitrile. Yield: 173 g.= 20.6% of the theoretical. Without concurrent use of $H_2PtCl_6$/active carbon, the yield was only 85 g.=10.1% of the theoretical.

*Example 4*

Beta-cyanoethylmethyldichlorosilane was prepared as described in Example 1 using 50 g. pyridine instead of the para-aminobenzonitrile. Yield: 342 g.=40.7% of the theoretical.

*Example 5*

575 g. (5 mols) of methylhydrogendichlorosilane and 265 g. (5 mols) of acrylonitrile were mixed in a glass apparatus. This mixture was then stirred with 50 g. of 2,6-di-tertiary-butyl-4-methylphenol then with 5 g. active carbon and finally with 5 ml. isopropanol containing 125 mg. Pt in the form of $H_2PtCl_6 \cdot 6H_2O$ dissolved therein. The mixture was heated for only 3.5 hours at 197° to 200° C. in the stainless steel autoclave described in Example 1. After cooling, the reaction product was processed as described in Example 1. Yield: 100 g.=11.9% of the theoretical. Without concurrent use of $H_2PtCl_6$/active carbon, 47 g.=5.6% of the theoretical are obtained.

*Example 6*

1150 g. (10 mols) methylhydrogendichlorosilane and 265 g. (5 mols) of acrylonitrile are mixed in a glass utensil. This mixture was then stirred with 5 g. of 2,6-di-tertiary-butyl-4-methylphenol and 20 g. crystal violet, then with 5 g. active carbon and finally with 5 ml. isopropanol which contained 125 mg. Pt in the form of $H_2PtCl_6.6CH_2O$ dissolved therein. The mixture was heated in the autoclave described in Example 1 for 10.5 hours at 225° to 235° C. After cooling, the reaction mixture was processed as described in Example 1. Yield: 256 g.=30.5 percent of the theoretical.

If this is done in the absence of the hindered phenol, the yield after heating for 20 hours is 15.4% of the theoretical.

In the absence of platinum/active carbon alone the yield after heating for 12 hours is 14.0%. Using only platinum/active carbon, the yield after heating for 12 hours is 13%.

*Example 7*

246 g. of beta-cyanoethylmethyldichlorosilane were obtained by using 65 g. of cyanoethylated p-aminobenzonitrile of the formula $$NC—C_6H_4—N(CH_2—CH_2CN)_2$$

prepared according to "Angewandte Chemie," 1949, page 235, working as described in Example 1. The yield was 29.3% of the theoretical.

*Example 8*

218 g. (26% of the theoretical) beta-cyanoethylmethyldichlorosilane were obtained by replacing the p-aminobenzonitrile with 70 g. of $HCON(CH_2CH_2CN)_2$ prepared according to "Angewandte Chemie," 1949, page 236, working as in Example 1.

*Example 9*

Instead of para-aminobenzonitrile, 70 g. of a cyanoethylated amine obtained by reacting 54 g. of 4,4'-diamino-diphenylmethane with 106 g. acrylonitrile in the presence of 0.5 g. Na were used in the method of Example 1. 234 g. (28% of the theoretical) beta-cyanoethylmethyldichlorosilane were obtained.

*Examples 10–18*

In each of the following examples 1150 g. of methyldichlorosilane (10 mols) and 265 g. of acrylonitrile (5 mols) were used. 5 ml. isopropanolic platinum-IV-hydrochloric acid with 125 mg. platinum and 5 g. active charcoal were added. The combinations were heated in the autoclave for 1½ hours to 2 hours to 230° C. and kept at this temperature for 12 hours. The following table contains informations on the type and quantity of pigment catalysts and other additives used and the yields of beta-cyanoethylmethyldichlorosilane obtained in grams and percent of the theoretical calculated on acrylonitrile.

That which is claimed is:

1. The method of preparing cyanoethyl substituted silanes consisting essentially of reacting acrylonitrile with silanes of the general formula $R_nHSiX_{3-n}$ wherein each R is a monovalent hydrocarbon radical free of aliphatic unsaturation, $n$ has a value from 1 to 2 inclusive, and each X is a hydrolyzable substituent selected from the group consisting of halogen atoms, alkoxy, aryloxy, halogenoalkoxy and halogenoaryloxy radicals in the presence of a catalyst system consisting essentially of (1) platinum and a co-catalyst (2) a compound selected from the group consisting of (a) compounds of the general formula

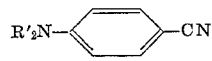

wherein each R' is a monovalent substituent selected from the group consisting of hydrogen atoms, alkyl radicals of less than 7 carbon atoms and cyanoalkyl radicals of less than 7 carbon atoms, (b) a cyanoethylated amine of the formula $CH_3N(CH_2CH_2CN)_2$ (c) cyanoethylated acid amide of the formula $O=CHN(CH_2CH_2CN)_2$, and (d) quinoidal pigments, at a temperature in the range 40°–350° C.

2. The method of claim 1 further characterized in that an inert carrier for the platinum is added to the reaction mass.

3. The method of claim 1 further characterized in that (1) platinum and (2) p-aminobenzonitrile are the catalysts.

4. The method of claim 1 wherein the silane has the formula $RHSiX_2$ where R is a monovalent hydrocarbon radical free of aliphatic unsaturation and X is a hydrolyzable substituent selected from the group consisting of halogen atoms, alkoxy, aryloxy, halogenoalkoxy and halogenoaryloxy radicals.

5. The method of claim 4 wherein the platinum is added as $H_2PtCl_6.H_2O$.

6. The method of preparing cyanoethyl substituted silanes consisting essentially of reacting acrylonitrile with silanes of the general formula $R_nHSiX_{3-n}$ wherein each R is a monovalent hydrocarbon radical free of aliphatic unsaturation, $n$ has a value from 1 to 2 inclusive, and each X is a hydrolyzable substituent selected from the group consisting of halogen atoms, alkoxy, aryloxy, halogenoalkoxy and halogenoaryloxy radicals in the presence of a catalyst system consisting essentially of (1) platinum and a co-catalyst (2) a quinoidal pigment; at a temperature in the range 40°–350° C.

7. The method of claim 6 wherein co-catalyst (2) is triphenylmethane pigment.

8. The method of claim 6 wherein co-catalyst (2) is crystal violet.

9. The method of claim 6 wherein the silane has the formula $RHSiX_2$ where R is a monovalent hydrocarbon radical free of aliphatic unsaturation and X is a hydrolyzable substituent selected from the group consisting of halogen atoms, alkoxy, aryloxy, halogenoalkoxy and halogenoaryloxy radicals.

| Formulation | Pigment class | Amount in g. | Pigment | Amount in g. | Further additive | Yield of beta-cyanoethyl-methyl-di-chlorosilane in g. | Yield in percent of theoret., calculated on acrylonitrile |
|---|---|---|---|---|---|---|---|
| 1 | Phenazine | 20 | Indulin base N (Bad. Anilin- & Soda-Fabrik). | 10 | 2,6-di-tert.-butyl-4-methylphenol. | 218 | 25.8 |
| 2 | do | 20 | Indulin base N-hydrochloride | | | 254 | 30.2 |
| 3 | Flavanthrene | 40 | Indanthren yellow G (Bad. Anilin- & Soda-Fabrik) | | | 243 | 28.9 |
| 4 | Benzanthrone | 40 | Idanthren dark blue BOA (Farbwerke Hoechst) | 10 | 2,6-di-tert.-butyl-4-methylphenol. | 265 | 31.5 |
| 5 | Oxazine | 30 | Permanent violet RL (Farbwerke Hoechst) | | | 194 | 23.1 |
| 6 | Benzanthrone | 40 | Isoviolanthrone (Bad. Anilin- & Soda-Fabrik). | | | 275 | 32.7 |
| 7 | Thiazine | 30 | Methylene blue (Merck/Deutsches Arzneibuch, 6th edition). | | | 250 | 29.8 |
| 8 | Oxazine | 40 | Zapon fast blue 3 G (Farbwerke Hoechst). | | | 244 | 29.0 |
| 9 | Thiazine | 30 | Methylene blue (Merck/Deutsches Arzneibuch, 6th edition). | 10 | 2,6-di-tert.-butyl-4-methylphenol. | 281 | 33.4 |

10. The method of claim 9 wherein the platinum is added as $H_2PtCl_2 \cdot H_2O$.

11. The method of claim 6 further characterized in that an inert carrier for the platinum is added to the reaction mass.

References Cited in the file of this patent

UNITED STATES PATENTS

| | | |
|---|---|---|
| 2,823,218 | Speier et al. | Feb. 11, 1958 |
| 2,906,764 | Jex et al. | Sept. 29, 1959 |
| 2,908,700 | Jex et al. | Oct. 13, 1959 |
| 2,908,701 | Jex et al. | Oct. 13, 1959 |
| 3,099,670 | Prober | July 30, 1963 |

FOREIGN PATENTS

| | | |
|---|---|---|
| 1,140,577 | Germany | Dec. 6, 1962 |
| 786,020 | Great Britain | Nov. 6, 1957 |
| 847,805 | Great Britain | Sept. 14, 1960 |
| 1,118,500 | France | Mar. 19, 1956 |

OTHER REFERENCES

Goodman et al.: "Jour. Am. Chem. Soc.," vol. 79 (1957), pp. 3073–7.

Petrov et al.; "Izvestia Akad. Nauk. SSSR," 1957, pp. 1490–1 (52, Chem. Abstracts, 7135).

UNITED STATES PATENT OFFICE
CERTIFICATE OF CORRECTION

Patent No. 3,167,573                        January 26, 1965

Siegfried Nitzsche et al.

It is hereby certified that error appears in the above numbered patent requiring correction and that the said Letters Patent should read as corrected below.

Column 4, line 4, before "2,908,701" insert -- 2,908,700 and --; column 6, line 40, for "$R_nHSIX_{3-n}$" read -- $R_nHSiX_{3-n}$ --.

Signed and sealed this 27th day of July 1965.

(SEAL)
Attest:

ERNEST W. SWIDER                                EDWARD J. BRENNER
Attesting Officer                                   Commissioner of Patents